(12) United States Patent
Yoshida et al.

(10) Patent No.: US 7,900,035 B2
(45) Date of Patent: Mar. 1, 2011

(54) ELECTRONIC APPLIANCE AND STARTUP METHOD

(75) Inventors: Kikutada Yoshida, Tokyo (JP); Minoru Yajima, Chiba (JP)

(73) Assignee: Sony Corporation (JP)

( * ) Notice: Subject to any disclaimer, the term of this patent is extended or adjusted under 35 U.S.C. 154(b) by 810 days.

(21) Appl. No.: 11/891,288

(22) Filed: Aug. 9, 2007

(65) Prior Publication Data

US 2008/0040599 A1 Feb. 14, 2008

(30) Foreign Application Priority Data

Aug. 10, 2006 (JP) ................ P2006-218701

(51) Int. Cl.
*G06F 9/00* (2006.01)
*G06F 9/24* (2006.01)
*G06F 15/177* (2006.01)

(52) U.S. Cl. .................. 713/2; 713/1; 713/100
(58) Field of Classification Search .......... 713/1, 2, 713/100
See application file for complete search history.

(56) References Cited

U.S. PATENT DOCUMENTS

| | | | |
|---|---|---|---|
| 6,763,458 B1 * | 7/2004 | Watanabe et al. | 713/100 |
| 6,892,261 B2 * | 5/2005 | Ohno et al. | 710/260 |
| 7,098,899 B1 * | 8/2006 | Ginosar | 345/204 |
| 7,409,536 B2 * | 8/2008 | Guo et al. | 713/1 |
| 7,508,943 B2 * | 3/2009 | Widergren | 380/239 |
| 7,620,758 B2 * | 11/2009 | Hsu | 710/72 |
| 7,689,820 B2 * | 3/2010 | Pierce et al. | 713/2 |
| 2001/0018717 A1 * | 8/2001 | Shimotono | 709/319 |
| 2003/0036843 A1 * | 2/2003 | Okude et al. | 701/200 |
| 2004/0205755 A1 * | 10/2004 | Lescouet et al. | 718/100 |
| 2005/0273663 A1 * | 12/2005 | Yoon | 714/36 |
| 2006/0129861 A1 * | 6/2006 | Kee et al. | 713/323 |
| 2008/0077943 A1 * | 3/2008 | Pierce et al. | 719/329 |

FOREIGN PATENT DOCUMENTS

JP 2002-237977 A 8/2002

* cited by examiner

*Primary Examiner* — Mark Connolly
(74) *Attorney, Agent, or Firm* — Lerner, David, Littenberg, Krumholz & Mentlik, LLP (57) ABSTRACT

An electronic appliance which is carried by a user, the electronic appliance includes: a first processor configured to perform a first operating system, and to perform a first process of a user interface when the booting of the first operating system is completed; and a second processor configured to perform a second operating system which is booted within a shorter time period than the first operating system, to perform a second process of a user interface in which a user instruction is acquired from an input unit shared by the first processor when the booting of the second operating system is completed, and to suppress execution of the second process of the user interface when the booting of the first operating system is completed.

5 Claims, 7 Drawing Sheets

ELECTRONIC APPLIANCE AND STARTUP METHOD

CROSS-REFERENCE TO RELATED APPLICATIONS

This application claims priority from Japanese Patent Application No. JP 2006-218701 filed in the Japanese Patent Office on Aug. 10, 2006, the entire content of which is incorporated herein by reference.

BACKGROUND OF THE INVENTION

1. Field of the Invention

The present invention relates to an electronic appliance and a startup method, particularly to an electronic appliance and a startup method which shortens a sensible starting time 2. Description of the Related Art In recent years, market expansion is expected for a camera apparatus that is connected to networks via communications through USB (Universal Serial Bus), or communications conforming to radio LAN (Local Area Network) or Bluetooth (trademark), and a camera apparatus that utilizes a large capacity recording medium such as a flash memory or HDD (Hard Disk Drive).

In order to meet the connection to networks and the access to a large capacity recording medium, the scale of software to be developed becomes large, and in order to develop it efficiently, the necessity arises that a high performance operating system (hereinafter, referred to as OS (Operating System)) is mounted and executed on a camera apparatus.

With the use of a high performance operating system, a software module such as a driver is prepared and run after startup, whereby various functions such as the function of connecting to networks and the function of access to a recording medium can be relatively easily mounted on a camera apparatus.

Figure 1:
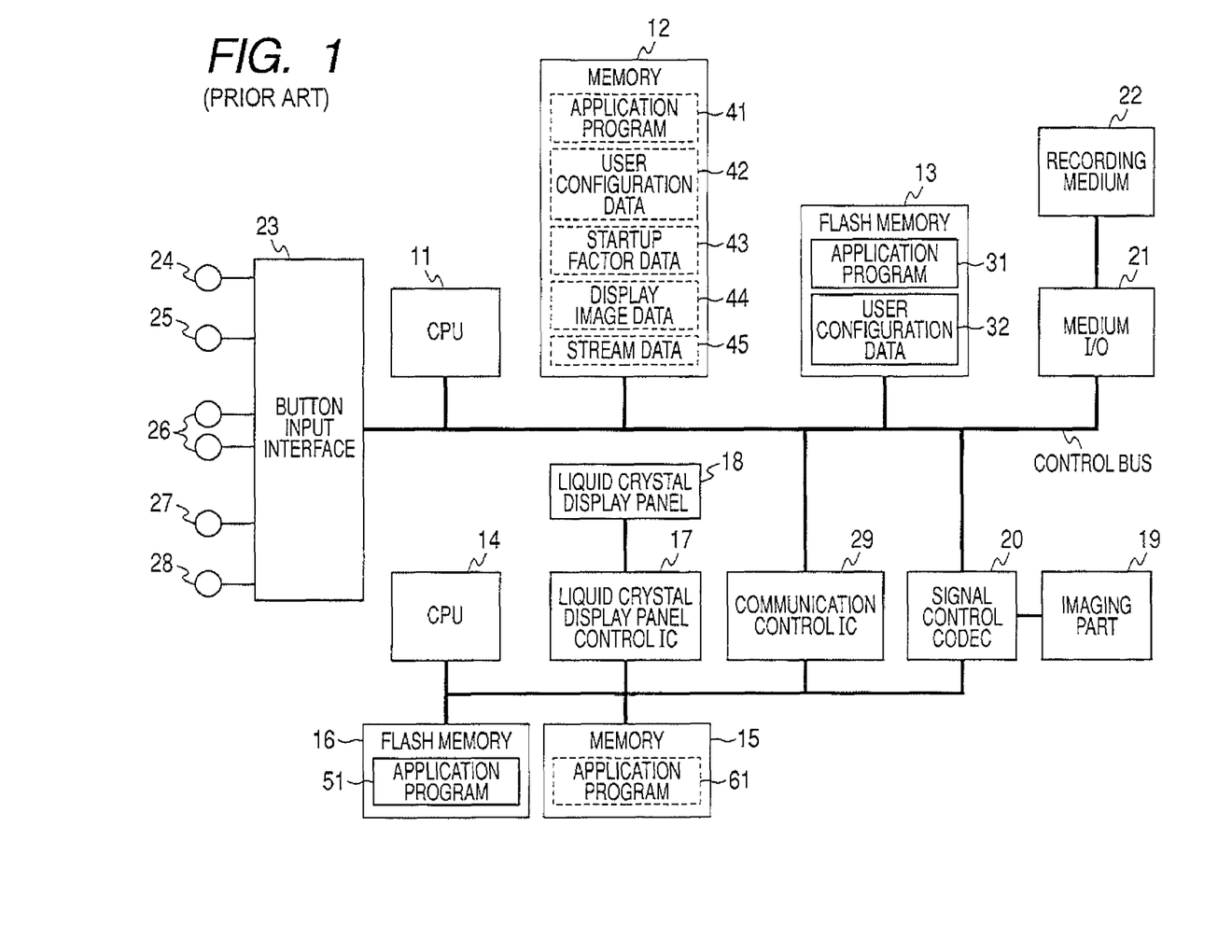
FIG. 1 shows a block diagram depicting the configuration of a related-art camera apparatus.

FIG. 1 shows a block diagram depicting the configuration of a related-art camera apparatus.

A camera apparatus is configured of a CPU (Central Processing Unit) 11, a memory 12, a flash memory 13, a CPU 14, a memory 15, a flash memory 16, a liquid crystal display panel control IC (Integrated Circuit) 17, a liquid crystal display panel 18, an imaging part 19, a signal control CODEC (COder/DECoder) 20, a medium I/O (Input/Output) 21, a recording medium 22, a button input interface 23, a power source button 24, a medium eject button 25, a zoom button 26, a liquid crystal display panel on/off button 27, a record button 28, and a communication control IC 29.

The CPU 11, the memory 12, the flash memory 13, the CPU 14, the memory 15, the flash memory 16, the liquid crystal display panel control IC 17, the imaging part 19, the signal control CODEC 20, the medium I/O 21, the button input interface 23, and the communication control IC 29 are connected through a control bus.

The CPU 11 executes programs such as an operating system or application programs stored in the memory 12, and processes the user interface. Here, the processing of the user interface is that a predetermined process is performed in response to operations done by a user, or that the presentation and notification of information are performed for a user.

The memory 12 stores therein programs executed by the CPU 11 and temporal data necessary to execute programs. In FIG. 1, data to be stored in the memory 12 is depicted by dotted lines, which indicate that these items of data are temporarily stored.

An application program 41 which is indicated as data temporarily stored in the memory 12 is the same program as an application program 31 stored in the flash memory 13, and user configuration data 42 is the same data as user configuration data 32 stored in the flash memory 13. When the power source button 24 is pressed, for example, to start the camera apparatus, the application program 31 and the user configuration data 32 stored in the flash memory 13 are copied, whereby the application program 41 and the user configuration data 42 are stored in the memory 12.

Startup factor data 43 is data that indicates the startup factor of the camera apparatus, which is stored in the memory 12 by the CPU 11 when the camera apparatus is started up.

Display image data 44 is data that displays an image on the liquid crystal display panel 18. For example, when an image is displayed on the liquid crystal display panel 18 based on image data stored on the recording medium 22, data is read out of the recording medium 22, decoded by the signal control CODEC 20, obtained, and then stored as the display image data 44 in the memory 12.

Stream data 45 is data of moving images to be recorded on the recording medium 22, which is stored in the memory 12 during recording. Image signals captured by the imaging part 19 during recording are encoded by the signal control CODEC 20, and data obtained by coding is stored as the stream data 45.

The flash memory 13 is a non-volatile memory, which stores therein programs and various items of data. In the example shown in FIG. 1, the flash memory 13 is stored therein with the application program 31 that is a program run by the CPU 11 by copying it on the memory 12, and the user configuration data 32 that is data indicating a set value done by a user on the operation of the camera apparatus such as shooting operation.

The CPU 14 executes a program such as the operating system or the application program stored in the memory 15, and controls the imaging part 19 and the signal control CODEC 20. As described above, the camera apparatus is provided with two CPUs. The CPU 11, one of the CPUs, processes the user interface, and the CPU 14, the other of the CPUs, controls imaging and signals in accordance with the instructions by the CPU 11.

The memory 15 stores therein programs executed by the CPU 14 and temporal data necessary to execute programs.

In the example shown in FIG. 1, an application program 61 that is the same program as the application program 51 stored in the flash memory 16 is shown as data to be temporarily stored in the memory 15. When the camera apparatus is started up, the application program 51 stored in the flash memory 16 is copied, whereby the application program 61 is stored in the memory 15.

The flash memory 16 is a non-volatile memory, which stores various items of data such as the application program 51 that is a program run by the CPU 14 by copying it on the memory 15.

The liquid crystal display panel control IC 17 controls display on the liquid crystal display panel 18.

The liquid crystal display panel 18 displays various images and text based on the control done by the liquid crystal display panel control IC 17.

The imaging part 19 is formed of a lens or a photoelectric conversion element, which converts optical images captured through a lens into image signals that are electrical signals, and supplies the converted and obtained image signals to the signal control CODEC 20.

The signal control CODEC 20 encodes the image signals supplied from the imaging part 19, and generates image data.

The image data generated by the signal control CODEC 20 is temporarily stored as the stream data 45 in the memory 12, and then recorded on the recording medium 22 through the medium I/O 21.

In addition, the signal control CODEC 20 decodes the image data recorded on the recording medium 22, and allows the liquid crystal display panel control IC 17 to display an image on the screen of the liquid crystal display panel 18 based on the data decoded and obtained.

The medium I/O 21 is an interface of the recording medium 22. The medium I/O 21 writes data on the recording medium 22, and reads data recorded on the recording medium 22.

The recording medium 22 is formed of an optical disk and its drive, or a semiconductor memory, or HDD, which records thereon the image data supplied through the medium I/O 21 and encoded by the signal control CODEC 20. The image data recorded on the recording medium 22 is properly read by the medium I/O 21, and used for display of images.

The CPU 11 and the CPU 14 communicate through the communication control IC 29. When the CPU 11 reads data to the communication control IC 29, the communication control IC 29 generates an interrupt signal to the CPU 14, and the CPU 14 reads data written by the CPU 11 out of the communication control IC 29. In addition, when the CPU 14 writes data to the communication control IC 29, the communication control IC 29 generates an interrupt signal to the CPU 11, and the CPU 11 reads data written by the CPU 14 out of the communication control IC 29. Therefore, communications are made between the CPU 11 and the CPU 14.

The button input interface 23 is an input interface for the power source button 24, the medium eject button 25, the zoom button 26, the liquid crystal display panel on/off button 27, and the record button 28, which receives a signal of a button pressed, and supplies a signal corresponding to the pressed button to the CPU 11 through the control bus.

The power source button 24 is a button that is pressed at the time of turning on or off the power source.

In the case in which the recording medium 22 is formed of an optical disk and its drive, the medium eject button 25 is a button that is pressed at the time of ejecting the optical disk.

In the case in which the recording medium 22 is formed of an optical disk and its drive and the medium eject button 25 is pressed in the state in which the power source of the camera apparatus is off, the camera apparatus is temporarily started to eject the optical disk. In other words, for the startup factor of the camera apparatus, there are at least two factors that the power source button 24 is pressed in the state in which the power source is off, and that the medium eject button 25 is pressed in the state in which the power source is off. The startup factor data 43 stored in the memory 12 indicates any one of these two factors.

The zoom button 26 is a button that is pressed at the time of zooming in or zooming out.

The liquid crystal display panel on/off button 27 is a button that is pressed at the time of starting display on the liquid crystal display panel 18, or ending display on the liquid crystal display panel 18.

The record button 28 is a button that is pressed at the time of recording, that is, at the time of starting recording the image data that is encoded and obtained on the recording medium 22.

Figure 2:
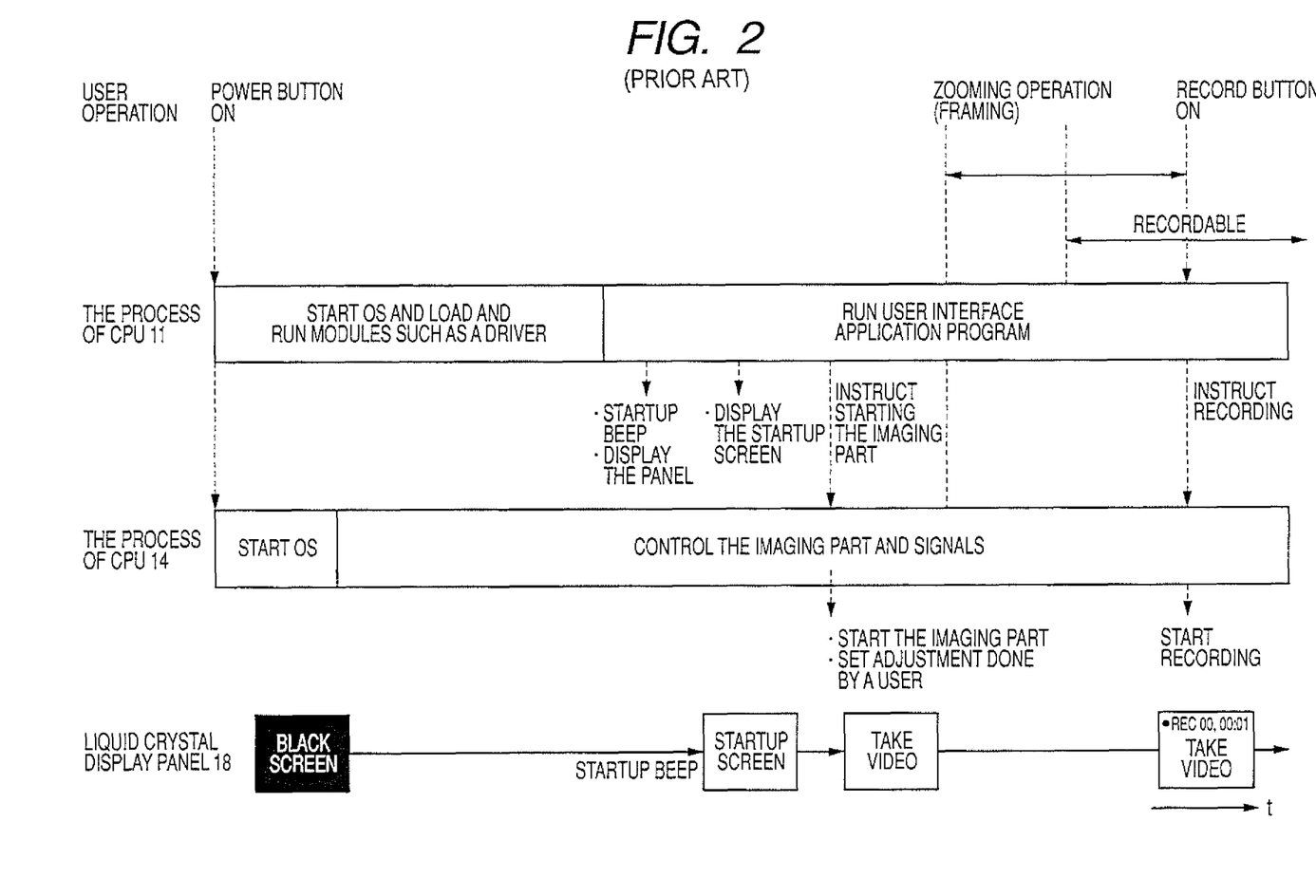
FIG. 2 shows a diagram depicting the process sequence of startup of the related-art camera apparatus.

FIG. 2 shows a diagram depicting the process sequence of starting a related-art camera apparatus having the configuration above.

The band shown on the upper stage in FIG. 2 depicts the process sequence of the CPU 11, and the band shown on the middle stage depicts the process sequence of the CPU 14. The lower stage depicts the descriptions of the screen displayed on the liquid crystal display panel 18. The lateral direction in FIG. 2 indicates the temporal direction.

When the power source button 24 is pressed, the CPU 11 starts boot an OS and the CPU 14 starts boot an OS at the same time. When the startup of the OS by the CPU 11 is completed, a module such as a driver is loaded, and the loaded module is executed by the CPU 11.

In the camera apparatus shown in FIG. 1, since the CPU 11 performs the process of the user interface, at the point in time when the CPU 11 starts boot the OS (at the point in time at which the boot of the OS is not completed), nothing is displayed on the liquid crystal display panel 18, and the screen displayed on the liquid crystal display panel 18 remains black.

Moreover, in the camera apparatus shown in FIG. 1, the OS executed by the CPU 11 is a higher performance OS than the OS executed by the CPU 14, which is necessary to load and run various modules after booting in order to start the process of the user interface.

Therefore, suppose the time period until the process of the user interface can be started including the time period taken to load and run modules is the time period necessary to boot the OS run by the CPU 11, the time period is longer than the time period necessary to boot the OS run by the CPU 14. The OS run by the CPU 14 is configured in which it is unnecessary to load and run various modules after booting, and the application program is run after booting to start imaging control and signal control that are primary functions.

When the booting of the OS run by the CPU 14 is completed, the CPU 14 copies the application program 51 stored in the flash memory 16 to the memory 15, and executes the application program 61 stored in the memory 15, whereby it starts imaging control and signal control, that is, it starts control over the imaging part 19 and the signal control CODEC 20. Before the booting of the OS by the CPU 11 is completed, the CPU 14 starts control over the imaging part 19 and the signal control CODEC 20.

When the booting of the OS is completed and the execution of the loaded modules such as a driver is also completed, after the CPU 14 starts processing, the CPU 11 starts the process of the user interface. The process of the user interface is performed by copying the application program 31 stored in the flash memory 13 to the memory 12 in accordance with the application program 41 stored in the memory 12.

For example, the CPU 11 instructs the CPU 14 to allow the liquid crystal display panel control IC 17 to start display on the liquid crystal display panel 18, to display a startup screen on the liquid crystal display panel 18 and to output a startup beep from a speaker, not shown. In addition, it also instructs the CPU 14 to boot the imaging part 19.

When the booting of the imaging part 19 is instructed by the CPU 11, the CPU 14 boots the imaging part 19. In addition, the CPU 14 sets the operation of the imaging part 19 in accordance with adjustment done by a user shown from the user configuration data 42 stored in the memory 12. When the booting of the imaging part 19 and the setting of its operation are completed, an image taken by the imaging part 19 is displayed on the liquid crystal display panel 18.

When the image taken by the imaging part 19 is displayed on the liquid crystal display panel 18, the CPU 11 accepts the adjustment of framing in accordance with user's zooming operation done by using the zoom button 26.

At the timing slightly behind the timing at which the booting of the imaging part 19 and the setting of the operation of the imaging part 19 are completed and the framing adjustment is allowed, recording is allowed. In response to the press of the record button 28 to instruct starting recording, the CPU 11 instructs the CPU 14 to start recording.

The CPU 14 instructed to start recording controls the imaging part 19 and the signal control CODEC 20 to start recording. At this time, the CPU 11 instructs the CPU 14 to display information indicating that an image is being recorded and the time period from the start of recording on the liquid crystal display panel 18 as overlaid on the image being taken by the imaging part 19, and the CPU 14 controls the liquid crystal display panel control IC 17 based on the instruction from the CPU 11.

The process of starting the related-art camera apparatus is performed in accordance with the flow described above.

JP-A-2002-237977 discloses a technique in which shooting is prepared when the power source is turned on based on management information of a recording medium stored in a memory, whereby the starting time can be shortened.

SUMMARY OF THE INVENTION

In the case in which a high performance OS is booted in a camera apparatus, it is necessary to perform such processes as pre-processing that many modules such as a driver are loaded, the apparatus is connected to networks, or a file system is initialized. Thus, the booting of programs to execute the primary functions of the camera apparatus is delayed, the functions such as the application program 41 in FIG. 1 including the acceptance of user operations to start shooting.

There is also a technique in which as a suspend and resume in a personal computer, when an application program is once booted and then it is instructed to turn off a power source, a CPU is stopped or the mode is turned to a low power consumption mode while power is being supplied to peripheral ICs and a memory, which is the state in which the power source is shut for a user, and the power source is turned on next time, and then the codes of the application program already stored in the memory are executed.

However, the frequency of use of the camera apparatus to take moving images is lower than the frequency of use of the personal computer, and in the case in which a technique such as suspend like this is applied to the camera apparatus, since the time period for suspend is long, power stored in a battery is consumed during suspend, causing the time period allowed for shooting to be shorter. Therefore, it can be said that the technique such as suspend like this is not suited for the camera apparatus having a battery therein for portable use.

Such a technique is expected that power is not consumed during standby in which the power source is off, and the time period to allow starting shooting after the power source is turned on can be shorter.

It is therefore desirable to more shorten a sensible starting time that is a time period to start a desired process after startup.

An electronic appliance according to an embodiment of the invention is an electronic appliance which is carried by a user, the electronic appliance including: a first processor configured to perform a first operating system, and to perform a first process of a user interface when the booting of the first operating system is completed; and a second processor configured to perform a second operating system which is booted within a shorter time period than the first operating system, to perform a second process of a user interface in which a user instruction is acquired from input means shared by the first processor when the booting of the second operating system is completed, and to suppress execution of the second process of the user interface when the booting of the first operating system is completed.

The first processor may allow the second processor to start the booting of the second operating system and then start the booting of the first operating system.

The first processor may allow the second processor to start the booting of the second operating system and to start the booting of the first operating system as well as may read data that is stored in advance and indicates an instruction for operation from the user to a storage area which is shared by the first process of the user interface and the second process of the user interface.

The first processor may write data that indicates a factor of booting to a storage area used by the second process of the user interface, and the second processor may execute the second process of the user interface depending on a factor of booting in accordance with data that indicates the written factor of booting.

The second processor may execute the similar process as a part of the first process of the user interface as the second process of the user interface.

An embodiment of the invention is a startup method of an electronic appliance which is carried by a user, the method including the steps of: performing a first process of a user interface when the booting of a first operating system is completed by a first processor configured to perform the first operating system; performing a second process of a user interface in which a user instruction is acquired from input means shared by the first processor when the booting of a second operating system is completed by a second processor configured to perform the second operating system which is booted within a shorter time period than the first operating system; and suppressing execution of the second process of the user interface by the second processor when the booting of the first operating system is completed.

According to an embodiment of the invention, when the first processor which performs the first operating system completes the booting of the first operating system, the first process of the user interface is performed. When the second processor which performs the second operating system booted within a shorter time period than the first operating system completes the booting of second operating system, the second process of the user interface is performed in which the user instruction is acquired from the input means shared by the first processor. In addition, when the booting of the first operating system is completed, the execution of the second process of the user interface by the second processor is suppressed.

According to an embodiment of the invention, a sensible starting time can be made more shortened.

DETAILED DESCRIPTION

Hereinafter, an embodiment of the invention will be described. The following is examples of the correspondence between configuration requirements for the invention and the embodiments of the specification or the drawings. This is described for confirming that the embodiments supporting the invention are described in the specification or the drawings. Therefore, even though there is an embodiment that is described in the specification or the drawings but is not described herein as an embodiment corresponding to configuration requirements for the invention, it does not mean that the embodiment does not correspond to those configuration requirements. Contrary to this, even though an embodiment is described herein as an embodiment corresponding to configuration requirements, it does not mean that the embodiment does not correspond to configuration requirements other than those configuration requirements.

An electronic appliance according to an embodiment of the invention (for example, a camera apparatus 101 shown in FIG. 3) is electronic appliance which is carried by a user, the electronic appliance including: a first processor (for example, a CPU 111 shown in FIG. 3) configured to perform a first operating system, and to perform a first process of a user interface when the booting of the first operating system is completed; and a second processor (for example, a CPU 112 shown in FIG. 3) configured to perform a second operating system which is booted within a shorter time period than the first operating system, to perform a second process of a user interface in which a user instruction is acquired from an input means shared by the first processor when the booting of the second operating system is completed, and to suppress execution of the second process of the user interface when the booting of the first operating system is completed.

Figure 6:
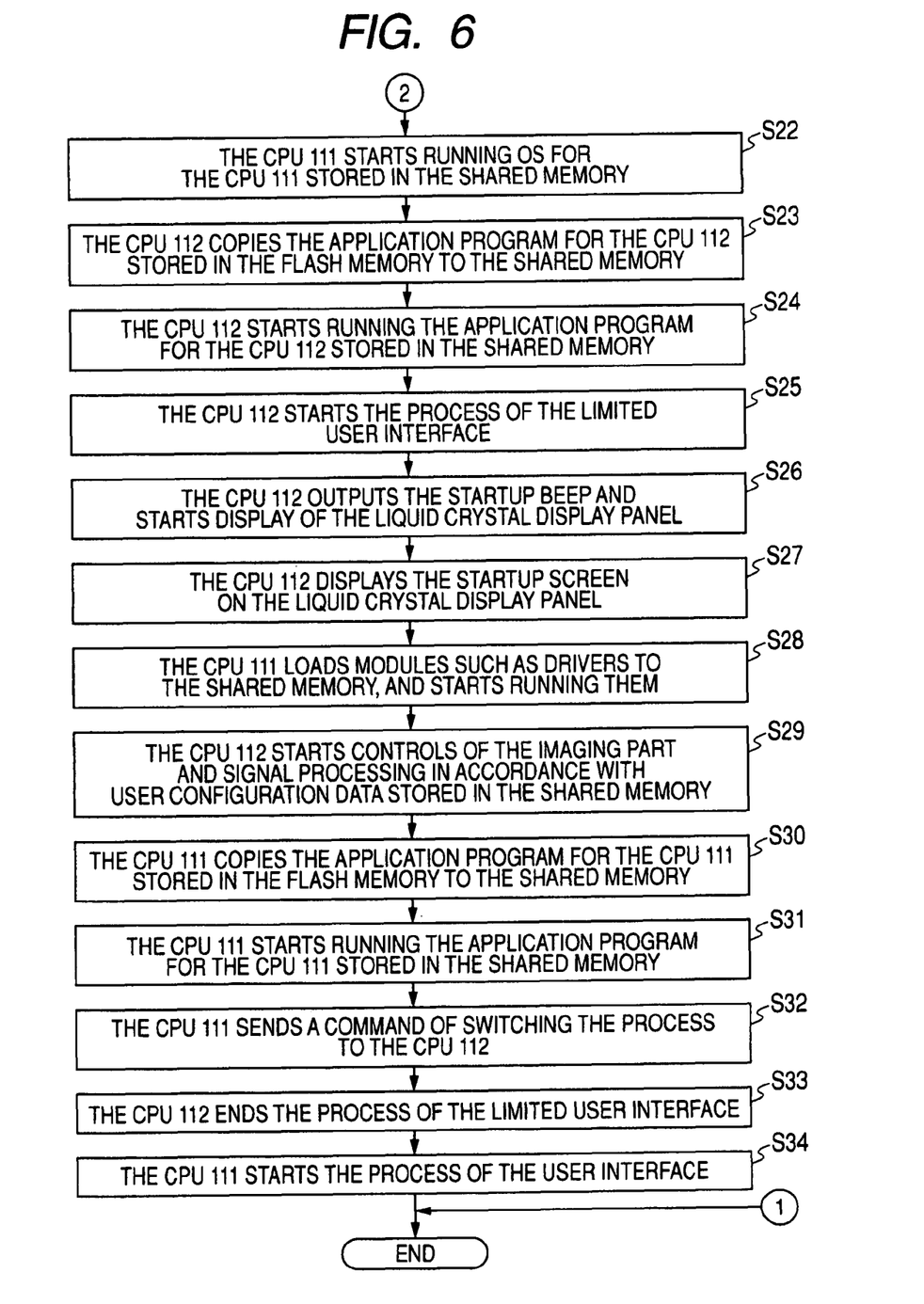
FIG. 6 shows a flow chart illustrative of the process of startup of the camera apparatus shown in FIG. 3, following FIG. 5.

A startup method according to an embodiment of the invention is a startup method of an electronic appliance which is carried by a user, the method including the steps of: performing a first process of a user interface when the booting of a first operating system is completed by a first processor configured to perform the first operating system (for example, Step S34 in FIG. 6); performing a second process of a user interface in which a user instruction is acquired from an input means shared by the first processor when the booting of a second operating system is completed by the second processor configured to perform a second operating system which is booted within a shorter time period than the first operating system (for example, Step S25 in FIG. 6); and suppressing execution of the second process of the user interface by the second processor when the booting of the first operating system is completed (for example, Step S33 in FIG. 6).

Figure 3:
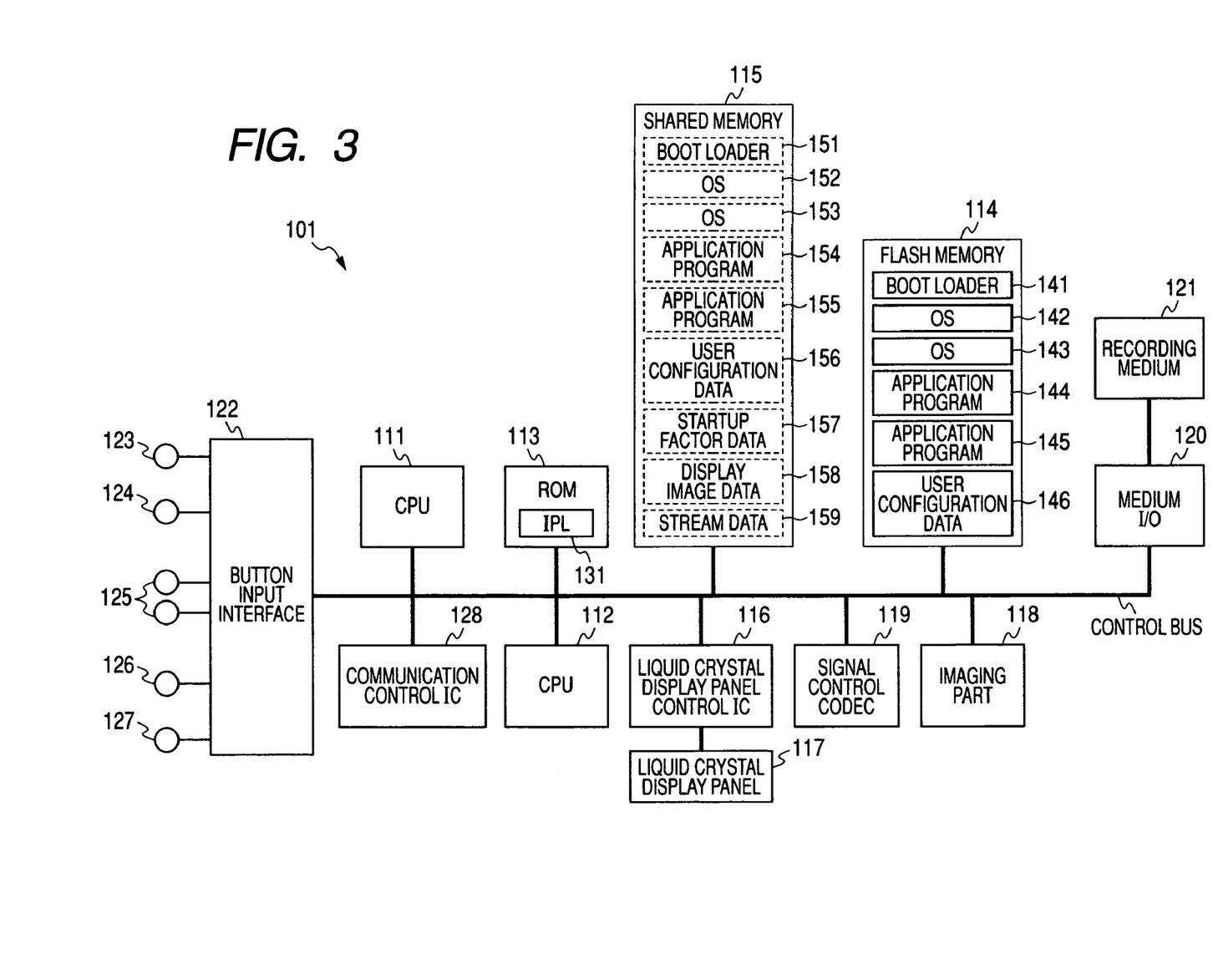
FIG. 3 shows a block diagram depicting an exemplary configuration of a camera apparatus according to an embodiment of the invention.

FIG. 3 shows a block diagram depicting an exemplary configuration of a camera apparatus 101 according to an embodiment of the invention.

The camera apparatus 101 is an electronic appliance in the size easily carried, which is configured of a CPU 111, a CPU 112, ROM (Read Only Memory) 113, a flash memory 114, a shared memory 115, a liquid crystal display panel control IC 116, a liquid crystal display panel 117, an imaging part 118, a signal control CODEC 119, a medium I/O 120, a recording medium 121, a button input interface 122, a power source button 123, a medium eject button 124, a zoom button 125, a liquid crystal display panel on/off button 126, a record button 127, and a communication control IC 128.

The CPU 111, the CPU 112, the ROM 113, the flash memory 114, the shared memory 115, the liquid crystal display panel control IC 116, the imaging part 118, the signal control CODEC 119, the medium I/O 120, the button input interface 122, and the communication control IC 128 are connected through a control bus.

As described above, the camera apparatus 101 has an appliance having two CPUs.

The CPU 111, one of the CPUs, is a CPU that basically controls a user interface for processing in response to operations done by a user, and for presentation and notification of information for a user, and the CPU 112, the other CPU, is a CPU that basically performs control relating to shooting moving images such as control over the imaging part 118 and signal control.

The OS executed by the CPU 111 is a high performance OS such as Linux (trademark) and Windows (trademark). In contrast to this, the OS executed by the CPU 112 is an OS that the function is lower than the OS executed by the CPU 111 but can be booted at high speed, such as iTron (trademark) and VxWORKS (trademark).

After the OS is booted, the CPU 111 loads and performs various modules such as a driver, and then executes an application program defining the process of the user interface. Thus, suppose the time period until the process of the user interface can be started is a time period necessary to boot the OS executed by the CPU 111, the time period is longer than the time period necessary to boot the OS executed by the CPU 112.

The OS executed by the CPU 112 is configured in which it is unnecessary to load and run various modules after booting, and the application program is run after booting to start imaging control and signal control that are primary functions.

Therefore, since it takes time to allow the CPU 111 to start the process of the user interface, in the camera apparatus 101, it is configured in which during the time before the CPU 111 is allowed to start the process of the user interface, the CPU 112, the other CPU, performs a part of the process that has to be done by the CPU 111.

In other words, during the time before the CPU 111 is allowed to start the process of the user interface, the CPU 112 performs a part of the process of the user interface, such as the display of the startup screen, the output of the startup beep, turning on/off the liquid crystal display panel, the display of an image taken by the imaging part 118, and the framing adjustment in response to user's zooming operation.

Accordingly, as compared to the case in which the CPU 111 runs the application program and then displays the startup screen, or outputs the startup beep, the CPU 112 is allowed to perform these processes at an earlier timing, and a sensible starting time after the power source is turned on can be shortened. For a sequence of a flow of booting the camera apparatus 101 will be described with reference to the drawings later.

The CPU 111 shown in FIG. 3 executes programs such as an operating system or application programs stored in the shared memory 115, and processes the user interface.

The CPU 112 executes a program such as the operating system or the application program stored in the shared memory 115, and controls the imaging part 118 and the signal control CODEC 119.

The ROM 113 stores therein the program executed by the CPU 111. In the example shown in FIG. 3, the ROM 113 stores therein an IPL (Initial Program Loader) 131 which is a program executed by the CPU 111 when the power source is turned on. The IPL 131 is executed to copy a boot loader 141 stored in the flash memory 114 to the shared memory 115, and the process steps after that is performed in accordance with the boot loader 141.

The flash memory 114 is a non-volatile memory, which stores therein programs and various items of data executed by the CPU 111 and the CPU 112. In the example shown in FIG. 3, the boot loader 141, an OS 142, an OS 143, an application program 144, an application program 145, and user configuration data 146 are stored in the flash memory 114.

The boot loader 141 is a program that is copied by the shared memory 115 and executed by the CPU 111, which defines the order of booting the OS's and the application programs.

The OS 142 is an OS for the CPU 112 that is copied by the shared memory 115 and executed by the CPU 112. As described above, the OS 142 is the OS that does not take more time for booting than an OS for the CPU 111, in which after booting, an application program 154 is executed to implement shooting control as well as to implement a part of the process of the user interface as the process done by the CPU 112.

The OS 143 is the OS for the CPU 111 that is copied by the shared memory 115 and executed by the CPU 111. The OS 143 is the OS that takes more time for booting than the OS for the CPU 112, in which after booting, various modules such as a driver are loaded and executed, and then an application program 155 is executed to implement the process of the user interface as the process done by the CPU 111.

The application program 144 is a program for the CPU 112 that is copied by the shared memory 115 after the OS 142 is booted and then executed by the CPU 112. The application program 144 defines shooting control and a part of the process of the user interface done by the CPU 112.

The application program 145 is a program for the CPU 111 that is copied by the shared memory 115 after the OS 143 is booted and then executed by the CPU 111. The application program 145 defines the process of the user interface done by the CPU 111.

The user configuration data 146 is data that indicates set values done by a user for the operation of the camera apparatus 101 such as the shooting operation.

The shared memory 115 is a memory that is shared by the CPU 111 and the CPU 112 for use, which temporarily stores the programs and data necessary to execute programs in a predetermined storage area. In FIG. 3, data stored in the shared memory 115 is depicted by dotted lines, which indicate that these items of data are temporarily stored. Moreover, all the items of data depicted by dotted lines are not stored at the same time in the shared memory 115, which are each stored by the CPU 111 and the CPU 112 at a predetermined timing.

A boot loader 151, an OS 152, an OS 153, an application program 154, an application program 155, and user configuration data 156 shown as items of data temporarily stored in the shared memory 115 are items of data that are the copies of the boot loader 141, the OS 142, the OS 143, the application program 144, the application program 145, and the user configuration data 146 stored in the flash memory 114.

Startup factor data 157 is data that indicates the startup factors of the camera apparatus 101, which is stored by the CPU 111 when the camera apparatus 101 is start up.

Display image data 158 is data that displays an image on the liquid crystal display panel 117. For example, when an image is displayed on the liquid crystal display panel 117 based on image data stored on the recording medium 121, data is read out of the recording medium 121, and decoded and obtained by the signal control CODEC 119 and the data is stored as the display image data 158 in the shared memory 115.

Stream data 159 is data of moving images to be recorded on the recording medium 121, which is stored in the shared memory 115 during the time for which images are recorded. Image signals captured by the imaging part 118 at the time of recording are encoded by the signal control CODEC 119, and data encoded and obtained is stored as the stream data 159.

The liquid crystal display panel control IC 116 controls display on the liquid crystal display panel 117.

The liquid crystal display panel 117 displays various images and text based on the control done by the liquid crystal display panel control IC 116.

The imaging part 118 is formed of a lens or a photoelectric conversion element, which converts optical images captured through a lens to image signals that are electrical signals, and supplies the converted and obtained image signals to the signal control CODEC 119.

The signal control CODEC 119 encodes the image signals supplied from the imaging part 118, and generates image data. The image data generated by the signal control CODEC 119 is temporarily stored as the stream data 159 in the shared memory 115, and then recorded on the recording medium 121 through the medium I/O 120.

In addition, the signal control CODEC 119 decodes the image data recorded on the recording medium 121, and allows the liquid crystal display panel control IC 116 to display an image on the screen of the liquid crystal display panel 117 based on the data decoded and obtained.

The medium I/O 120 is an interface of the recording medium 121. The medium I/O 120 writes data on the recording medium 121, and reads data recorded on the recording medium 121.

The recording medium 121 is formed of an optical disk and its drive, or a semiconductor memory, or HDD, which records thereon the image data supplied through the medium I/O 120 and encoded by the signal control CODEC 119. The image data recorded on the recording medium 121 is properly read by the medium I/O 120, and used for display of images.

The CPU 111 and the CPU 112 communicate through the communication control IC 128. When the CPU 111 writes data to the communication control IC 128, the communication control IC 128 generates an interrupt signal to the CPU 112, and the CPU 112 reads data written by the CPU 111 out of the communication control IC 128. In addition, when the CPU 112 writes data to the communication control IC 128, the communication control IC 128 generates an interrupt signal to the CPU 111, and the CPU 111 reads data written by the CPU 112 out of the communication control IC 128. Thus, communications are made between the CPU 111 and the CPU 112.

The button input interface 122 is an input interface for a power source button 123, a medium eject button 124, a zoom button 125, a liquid crystal display panel on/off button 126, and a record button 127, which supplies signals in accordance with the pressed button to the CPU 111, or to the CPU 112 through the control bus. Since the signals in accordance with the pressed button are properly outputted to the CPU 111 and the CPU 112, the button input interface 122 is a shared input interface for the CPU 111 and the CPU 112.

The power source button 123 is a button that is pressed at the time of turning on or off the power source.

In the case in which the recording medium 121 is formed of an optical disk and its drive, the medium eject button 124 is a button that is pressed at the time of ejecting the optical disk out of the camera apparatus 101.

In the case in which the recording medium 121 is formed of an optical disk and its drive and the medium eject button 124 is ejected in the state in which the power source of the camera apparatus 101 is off, the camera apparatus 101 is temporarily booted to eject the optical disk. For the startup factor of the camera apparatus 101, there are at least two factors that the power source button 123 is pressed in the state in which the power source is off, and that the medium eject button 124 is pressed in the state in which the power source is off. The startup factor data 157 stored in the shared memory 115 indicates any one of these two factors.

The zoom button 125 is a button that is pressed at the time of zooming in or zooming out.

The liquid crystal display panel on/off button 126 is a button that is pressed at the time of starting display on the liquid crystal display panel 117, or ending display on the liquid crystal display panel 117.

The record button 127 is a button that is pressed at the time of recording, that is, at the time of starting recording the encoded and obtained image data on the recording medium 121.

Figure 4:
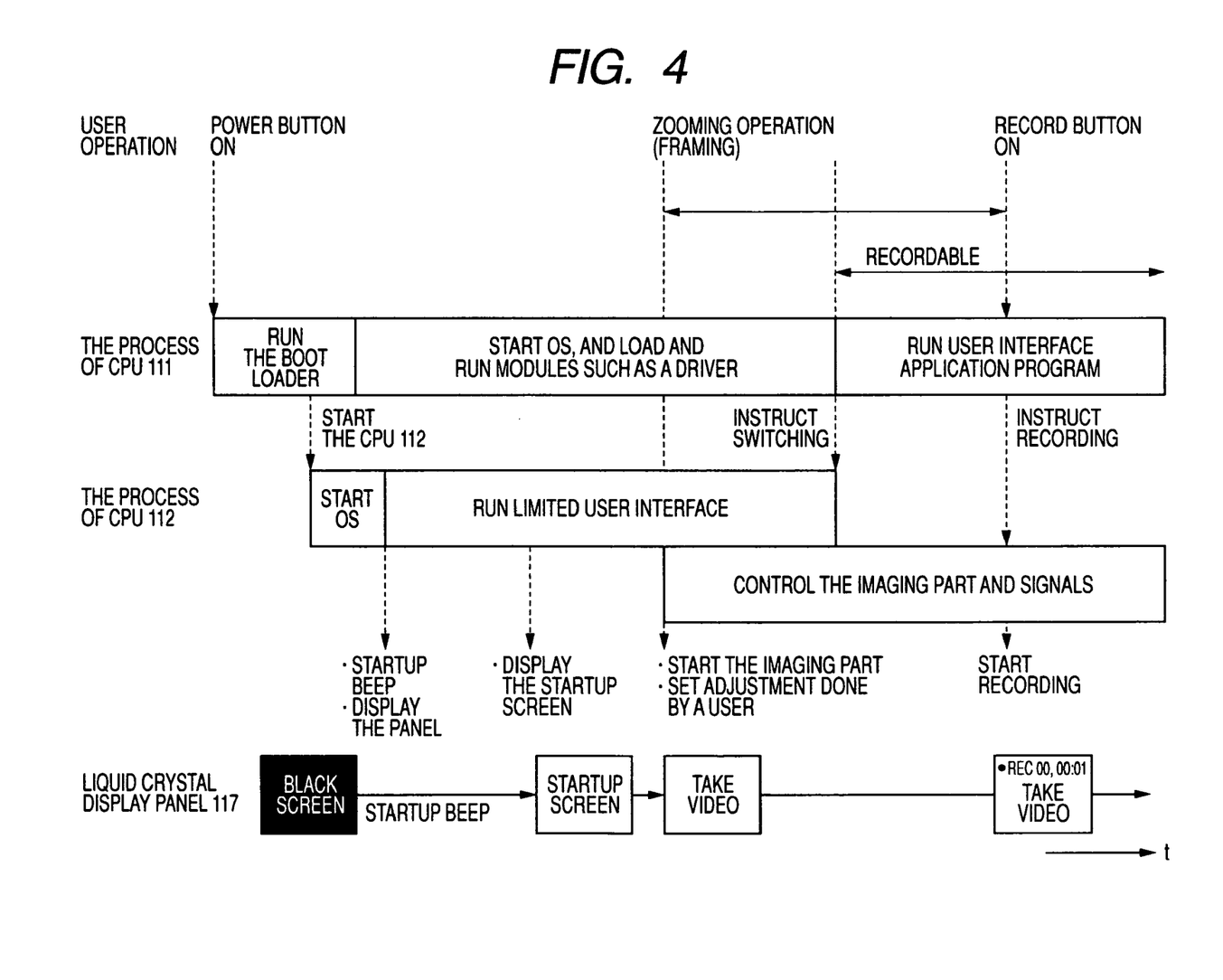
FIG. 4 shows a diagram depicting the process sequence of startup of the camera apparatus shown in FIG. 3.

FIG. 4 shows a diagram depicting the process sequence of starting the camera apparatus 101 having the configuration above.

The band shown on the upper stage in FIG. 4 depicts the process sequence of the CPU 111, and two bands shown on the middle stage and partially overlapped depict the process sequence of the CPU 112. The lower stage depicts the descriptions of the screen displayed on the liquid crystal display panel 117. The lateral direction in FIG. 4 indicates the temporal direction.

When the power source button 123 is pressed, the CPU 111 executes the IPL 131 stored in the ROM 113, and copies the boot loader 141 stored in the flash memory 114 to the shared memory 115. With this copying, the CPU 111 starts the boot loader 151 stored in the shared memory 115. Until the booting of the OS 143 that is the OS for the CPU 111 is completed, the process sequence of the CPU 111 is performed in accordance with the boot loader 151.

Since the IPL 131 and the boot loader 151 are programs with small functions and small data volumes, they can be executed within a shorter time period than the time period necessary to boot the OS for the CPU 111.

The CPU 111 having started executing the boot loader 151 copies the OS 142 that is the OS for the CPU 112 to the shared memory 115. In addition, the CPU 111 boots the CPU 112, and allows the CPU 112 to boot the OS 152 stored in the shared memory 115.

In the camera apparatus 101, since the startup screen is displayed to boot the OS 152, which is performed by the CPU 112 having started executing the application program 154, at the point in time at which the booting of the OS 152 is started, nothing is displayed on the liquid crystal display panel 117, and the screen displayed on the liquid crystal display panel 117 remains black.

After the CPU 112 is allowed to start the booting of the OS 152, the CPU 111 copies the OS 143 that is the OS for the CPU 111 to the shared memory 115, and starts booting the OS 153 copied to the shared memory 115 and reading modules such as a driver. The time period necessary to boot the OS 153 and to read modules such as a driver is a longer time period than the time period necessary to boot the OS for the CPU 112. Moreover, as described later, prior to the booting of the OS 153, the startup factor data 157 is stored in the shared memory 115 by the CPU 111.

In response to the instruction from the CPU 111, the CPU 112 boots the OS 152 which is the OS for the CPU 112 stored in the shared memory 115 by the CPU 111. Before the booting of the OS 153 is completed by the CPU 111, the booting of the OS 152 is completed.

When the booting of the OS 152 is completed, the CPU 112 copies the application program 144 which is the application program for the CPU 112 to the shared memory 115, and executes the application program 154. The process sequence of the CPU 112 after that is performed in accordance with the application program 154.

The CPU 112 having started executing the application program 154 outputs a startup beep from a speaker, not shown. In addition, the CPU 112 controls the liquid crystal display panel control IC 116, starts the display on the liquid crystal display panel 117, and then displays the startup screen on the liquid crystal display panel 117.

As described above, in the camera apparatus 101, a part of the process of the user interface is executed by the CPU 112 which is the CPU to execute the OS taking a shorter time for booting although its function is inferior. The process of the user interface executed by the CPU 112 is not the entire process of the user interface, which is the same process as a part of the process of the user interface, and it can be said that it is the limited process of the user interface in a sense that the function is limited.

The CPU 112 boots the imaging part 118 at a predetermined timing after the limited process of the user interface is started, and starts shooting by the imaging part 118 and control of signal processing by the signal control CODEC 119. In the camera apparatus shown in FIG. 1, the CPU 14 starts controlling the imaging part, for example, in response to the instruction from the CPU 11 (FIG. 2). In contrast to this, in the camera apparatus 101, the CPU 112 also starts controlling the imaging part 118 in a so-called spontaneous manner.

The control over shooting by the imaging part 118 and signal processing by the signal control CODEC 119 is performed by the CPU 112 in parallel with the limited process of the user interface.

The CPU 112 sets the operation of the imaging part 118 in accordance with the adjustment done by a user shown from the user configuration data 156 stored in the shared memory 115, after booting the imaging part 118. For example, in the case in which the focus position, white balance, and exposure adjustment are performed in advance by a user, the operation of the imaging part 118 is controlled so as to perform shooting in accordance with the adjustment values. As described later, the user configuration data 156 is stored in the shared memory 115 by the CPU 111 which executes the boot loader 151.

In addition, the CPU 112 displays an image taken by the imaging part 118 on the liquid crystal display panel 117 when the booting of the imaging part 118 and the setting of the operation are completed. Thus, a user can use the zoom button 125 to zoom to decide compositions.

When a user zooms, the CPU 112 accepts the zooming operation as the limited process of the user interface, and performs framing adjustment in accordance with user operations.

At the timing slightly behind the timing at which the framing adjustment is allowed, the booting of the OS for the CPU 111, the loading and execution of various modules such as a driver, and the booting of the application program for the CPU 111 are completed, and at this time, recording is allowed.

In response to the press of the record button 127 to instruct starting recording, the CPU 111 accepts the operation as the process of the user interface, and instructs the CPU 112 to start recording. In response to the instruction from the CPU 111, the CPU 112 controls the imaging part 118 and the signal control CODEC 119 for recording.

In addition, at this time, the CPU 111 instructs the CPU 112 to display information indicating that an image is being recorded and the time period from the start of recording on the liquid crystal display panel 117, and the CPU 112 controls the liquid crystal display panel control IC 116 based on the instruction from the CPU 111.

At the timing at which recording is allowed, to the CPU 112, the CPU 111 sends a switching command that instructs ending the limited process of the user interface. In response to sending the switching command, the CPU 112 ends the limited process of the user interface, and continues control relating to shooting such as control over the imaging part 118 and the signal control CODEC 119. The process of the user interface after that is took over by the CPU 111.

The booting of the camera apparatus 101 is performed by the flow as described above.

As described above, in the camera apparatus 101, a part of the process of the user interface is performed as the limited process of the user interface by the CPU 112 which is the CPU taking a shorter time for booting although the function is inferior, and the display of the startup screen and the display of images captured by the imaging part 118 are performed.

Thus, the sensible starting time can be shortened.

Figure 5:
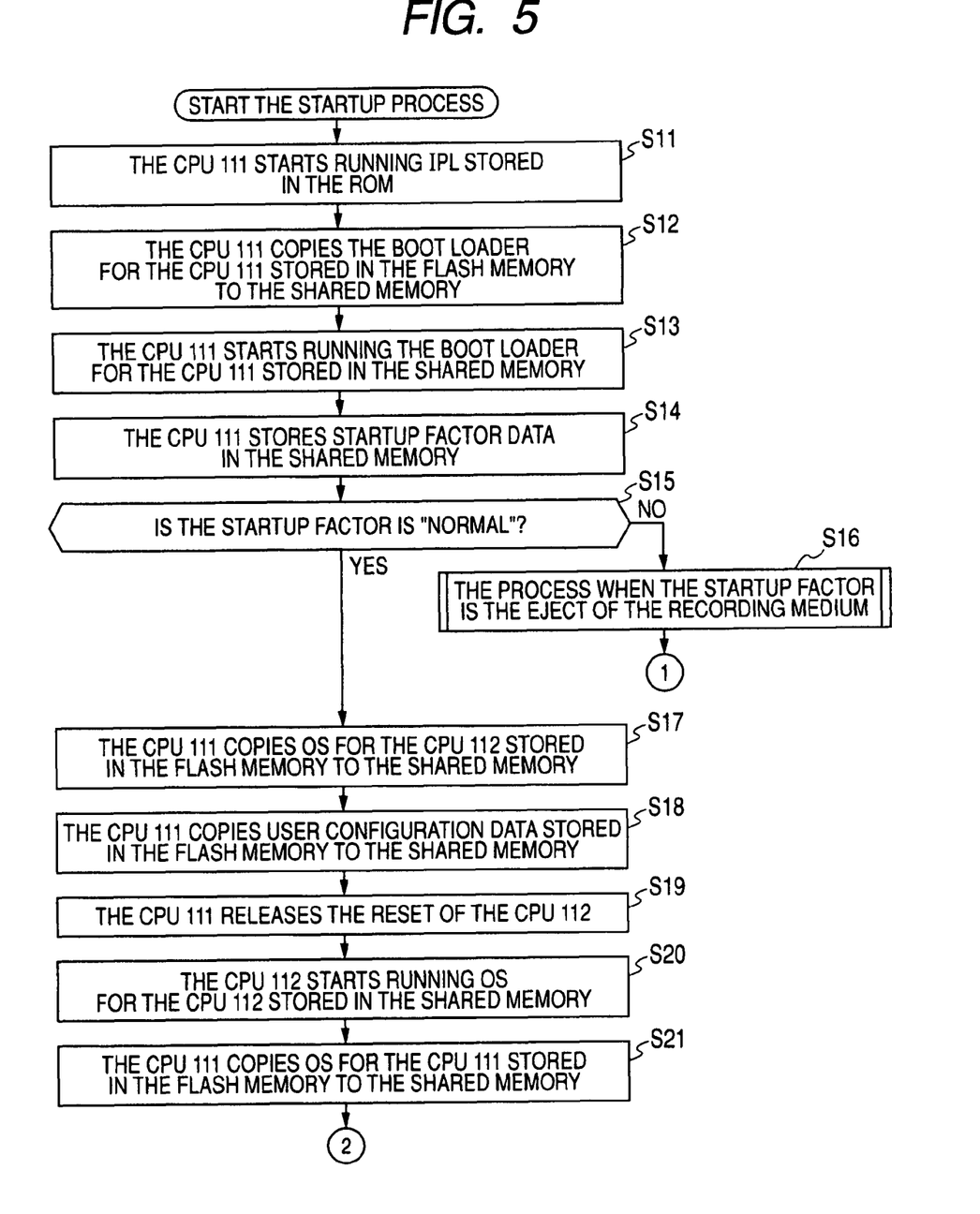
FIG. 5 shows a flow chart illustrative of the process of startup of the camera apparatus shown in FIG. 3.

Next, the process of starting the camera apparatus 101 will be described with reference to flow charts shown in FIGS. 5 and 6.

The process is performed in the state in which the power source is off when the power source button 123 is pressed, or when the medium eject button 124 is pressed.

In Step S11, the CPU 111 starts execution of the IPL 131 stored in the ROM 113, it goes to Step S12, and copies the boot loader 141 stored in the flash memory 114 to the shared memory 115.

In Step S13, the CPU 111 starts execution of the boot loader 151 stored in the shared memory 115. Until the booting of the OS 143 is completed, the process steps of the CPU 111 are performed in accordance with the boot loader 151.

In Step S14, the CPU 111 generates the startup factor data 157, and stores it in the shared memory 115. For example, when the power source button 123 is pressed to start booting, data is generated that indicates that this event is a startup factor, and is stored as the startup factor data 157 in the shared memory 115. In addition, when the medium eject button 124 is pressed to start booting, data is generated that indicates that this event is a startup factor, and is stored as the startup factor data 157 in the shared memory 115. Depending on the startup factor indicated by the startup factor data 157 stored here, the descriptions of the booting of the process are switched.

In Step S15, based on the startup factor data 157 stored in the shared memory 115, the CPU 111 determines whether the startup factor this time of the camera apparatus 101 is a normal startup factor by pressing the power source button 123.

If the CPU 111 determines in Step S15 that the startup factor this time of the camera apparatus 101 is not a normal startup factor by pressing the power source button 123, that is, it is the startup factor by pressing the medium eject button 124, it goes to Step S16. It performs the process in the case in which the startup factor is the ejection of the recording medium 121, and ends the process. The process in the case in which the startup factor is the ejection of the recording medium 121 will be described later with reference to a flow chart shown in FIG. 7.

On the other hand, in Step S15, if the CPU 111 determines that the startup factor this time of the camera apparatus 101 is a normal startup factor by pressing the power source button 123, it goes to is Step S17, and copies the OS 142 which is the OS for the CPU 112 and stored in the flash memory 114 to the shared memory 115.

In addition, in Step S18, the CPU 111 copies the user configuration data 146 stored in the flash memory 114 to the shared memory 115.

In Step S19, the CPU 111 releases the reset of the CPU 112, whereby it boots the CPU 112.

In Step S20, the CPU 112 having been booted in response to the instruction from the CPU 111 starts execution of the OS 152 which is the OS for the CPU 112 stored in the shared memory 115 by the CPU 111.

In Step S21, the CPU 111 copies the OS 143 which is the OS for the CPU 111 stored in the flash memory 114 to the shared memory 115, it goes to Step S22, and starts execution of the OS 153 stored in the shared memory 115.

In Step S23, the CPU 112 having started execution of the OS 152 copies the application program 144 which is the application program for the CPU 112 stored in the flash memory 114 to the shared memory 115, it goes to Step S24, and starts execution of the application program 154 stored in the shared memory 115.

In Step S25, the CPU 112 starts the limited process of the user interface.

In Step S26, the CPU 112 outputs a startup beep from a speaker, not shown, as the limited process of the user interface, and allows the liquid crystal display panel control IC 116 to start display on the liquid crystal display panel 117.

In addition, in Step S27, as the limited process of the user interface, the CPU 112 controls the liquid crystal display panel control IC 116 to display the startup screen on the liquid crystal display panel 117.

In Step S28, in response to the completion of the booting of the OS for the CPU 111, the CPU 111 loads various modules such as a driver, and starts the execution.

In Step S29, the CPU 112 boots the imaging part 118 to start control of shooting by the imaging part 118 and signal processing by the signal control CODEC 119. Here, the operation of the imaging part 118 is set based on the user configuration data 156 stored in the shared memory 115 by the CPU 111 in Step S18. At the time at which the setting is completed, an image taken by the imaging part 118 is displayed on the liquid crystal display panel 117, and a user confirms the display to set framing.

In Step S30, the CPU 111 copies the application program 145 which is the application program for the CPU 111 and stored in the flash memory 114 to the shared memory 115, it goes to Step S31, and starts execution of the application program 155 stored in the shared memory 115.

In Step S32, the CPU 111, which executes the application program 155 to allow the process of the user interface, sends to the CPU 112 a switching command that suppresses the process to end the limited process of the user interface.

In Step S33, in response to sending the switching command from the CPU 111, the CPU 112 ends the limited process of the user interface. For the state of the camera apparatus 101 set by a user, for example, while the CPU 112 is performing the limited process of the user interface, information indicating the state of the camera apparatus 101 is stored in the shared memory 115, and is taken over by reading it by means of the CPU 111.

In Step S34, the CPU 111 starts the process of the user interface, whereby the startup process is ended.

In the case in which the liquid crystal display panel 117 is turned on/off or the adjustment parameter of the imaging part 118 is set while the CPU 111 is performing the process of the user interface, information indicating the descriptions of the settings is stored in the shared memory 115, for example, by the CPU 111 in order to restore the settings at the next startup.

Figure 7:
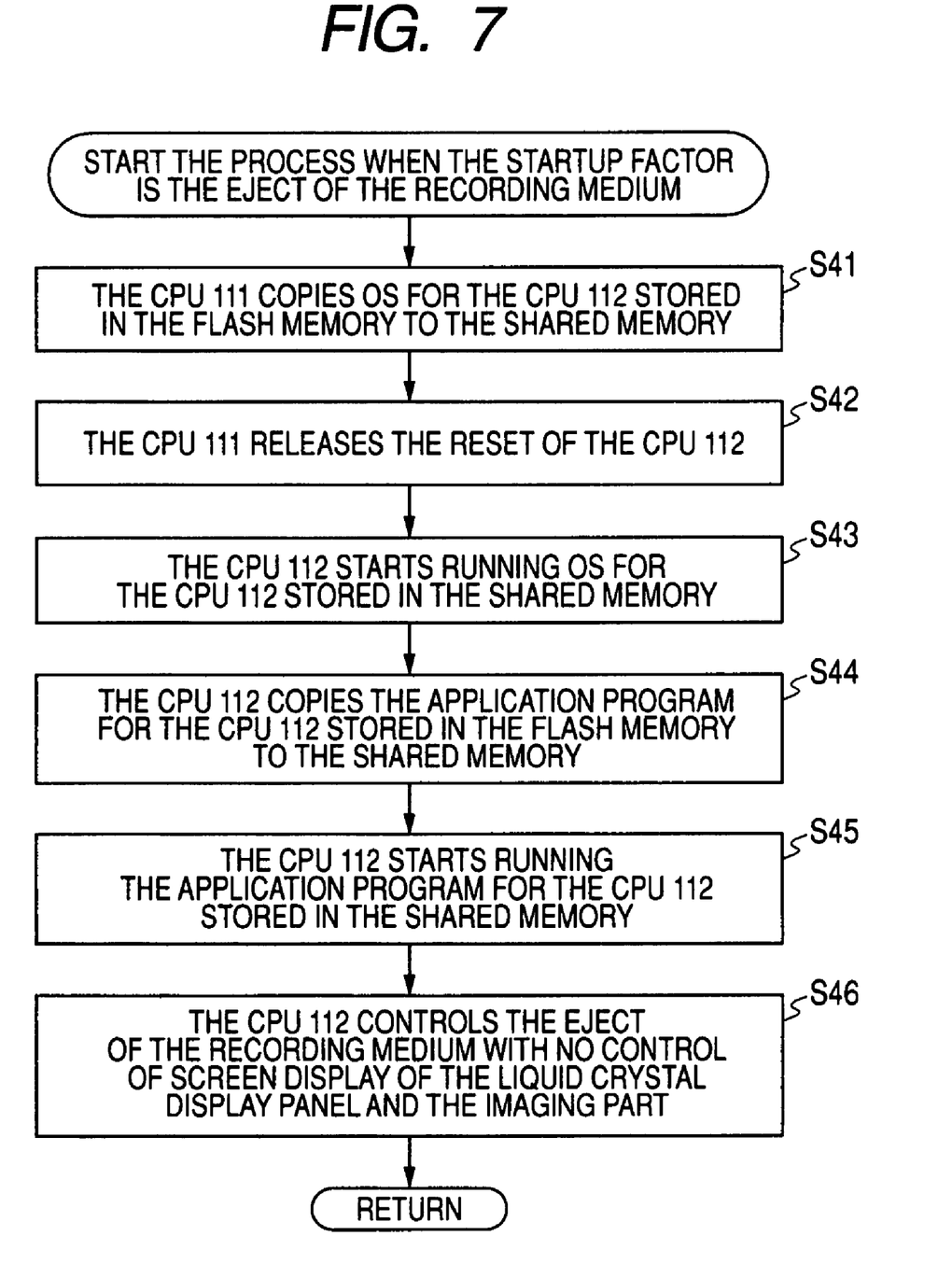
FIG. 7 shows a flow chart illustrative of the process steps done in Step S16 in FIG. 5.

Next, the process done in Step S16 in FIG. 5 in the case in which the startup factor is the ejection of the recording medium 121 will be described with reference to a flow chart shown in FIG. 7.

In Step S41, the CPU 111 copies the OS 142 which is the OS for the CPU 112 stored in the flash memory 114 to the shared memory 115.

In Step S42, the CPU 111 releases the reset of the CPU 112, whereby it boots the CPU 112.

In Step S43, the CPU 112 having been booted in response to the instruction from the CPU 111 starts execution of the OS 152 which is the OS for the CPU 112 stored in the shared memory 115 by the CPU 111.

In Step S44, the CPU 112 having started execution of the OS 152 copies the application program 144 which is the application program for the CPU 112 stored in the flash memory 114 to the shared memory 115, it goes to Step S45, and starts execution of the application program 154 stored in the shared memory 115.

In Step S46, the CPU 112 having started execution of the application program 154 controls the ejection of the recording medium 121 such as controlling the drive, for example, without controlling the display on the liquid crystal display panel 117 and the imaging part 118. After that, it returns to Step S16 in FIG. 5 to end the startup process.

With the processes described above, a shortened sensible starting time, for example, can be implemented.

In the discussion above, it is described to shorten the starting time of the camera apparatus 101. However, for example, this scheme may be done in which the processes described above are performed for various appliances that are necessary to execute an OS when booting, such as a cellular telephone, a player or a recorder conforming to DVD and Blu-ray Disc, and a terminal conforming to one-segment broadcasting, and a sensible starting time is shortened.

In addition, in the discussion above, the case is described in which two CPUs are provided in a single appliance, but the processes described above may be performed for an appliance provided with three or more CPUs.

Moreover, an embodiment of the invention is not restricted to the embodiment described above, which may be modified variously within the scope not deviating from the teachings of an embodiment of the invention.

It should be understood by those skilled in the art that various modifications, combinations, sub-combinations and alterations may occur depending on design requirements and other factors insofar as they are within the scope of the appended claims or the equivalents thereof.

The invention claimed is:

1. An electronic appliance which is carried by a user, the electronic appliance comprising:
   a first processor configured to perform a first operating system, and to perform a first process of a user interface when the booting of the first operating system is completed; and
   a second processor configured to perform a second operating system which is booted within a shorter time period than the first operating system, to perform a second process of a user interface in which a user instruction is acquired from input means shared by the first processor when the booting of the second operating system is completed, and to suppress execution of the second process of the user interface when the booting of the first operating system is completed.

2. The electronic appliance according to claim 1, wherein the first processor allows the second processor to start the booting of the second operating system, and then starts the booting of the first operating system.

3. The electronic appliance according to claim 1, wherein the first processor writes data that indicates a factor of booting to a storage area used by the second process of the user interface, and
   the second processor executes the second process of the user interface depending on a factor of booting in accordance with data that indicates the written factor of booting.

4. The electronic appliance according to claim 1, wherein the second processor, as a part of the first process of the user interface, executes a process similar to the second process of the user interface.

5. A startup method of an electronic appliance which is carried by a user, the method comprising:
   performing a first process of a user interface when the booting of a first operating system is completed by a first processor configured to perform the first operating system;
   performing a second process of a user interface in which a user instruction is acquired from input means shared by the first processor when the booting of a second operating system is completed by a second processor configured to perform the second operating system which is booted within a shorter time period than the first operating system; and
   suppressing execution of the second process of the user interface when the booting of the first operating system is completed.

* * * * *